United States Patent
Ben-Ari et al.

(10) Patent No.: US 8,493,963 B1
(45) Date of Patent: Jul. 23, 2013

(54) MULTIPLE TIME ACCURATE STROBE (TAS) MESSAGING

(75) Inventors: Daniel Ben-Ari, Moshav Zur Natan (IL); Uri Erlich, Matan (IL)

(73) Assignee: Marvell International Ltd., Hamilton (BM)

( * ) Notice: Subject to any disclaimer, the term of this patent is extended or adjusted under 35 U.S.C. 154(b) by 336 days.

(21) Appl. No.: 12/948,784

(22) Filed: Nov. 18, 2010

Related U.S. Application Data

(60) Provisional application No. 61/263,643, filed on Nov. 23, 2009.

(51) Int. Cl.
*H04J 3/06* (2006.01)

(52) U.S. Cl.
USPC ............ 370/350; 370/310; 375/220; 375/335

(58) Field of Classification Search
USPC ............................ 370/310, 350; 375/220, 355
See application file for complete search history.

(56) References Cited

U.S. PATENT DOCUMENTS

| | | | |
|---|---|---|---|
| 6,437,601 B1 | 8/2002 | Borkar et al. | |
| 6,469,514 B2 | 10/2002 | Okayasu | |
| 7,571,338 B2 | 8/2009 | Osterling et al. | |
| 7,750,845 B2 | 7/2010 | Lethbridge | |
| 7,936,793 B2 | 5/2011 | Quiroga et al. | |
| 7,948,964 B1 | 5/2011 | Khlat et al. | |
| 8,170,166 B2 | 5/2012 | Stebbings et al. | |
| 2009/0154446 A1* | 6/2009 | Adler et al. | 370/350 |
| 2010/0074311 A1* | 3/2010 | Kopmeiners | 375/220 |
| 2010/0215133 A1 | 8/2010 | Stebbings et al. | |
| 2011/0176535 A1 | 7/2011 | Lipka et al. | |
| 2011/0206143 A1 | 8/2011 | Reinhardt et al. | |

OTHER PUBLICATIONS

Draft Version 3.09.05 Revision 0.02—Dec. 7, 2009; DRAFT MIPI Alliance Specification for Dual Mode 2.5G/3G Baseband RFIC Interface; 2009; pp. 1-51; MIPI Alliance, Inc.
Draft Version 1.00.00 Revision 0.03—Dec. 15, 2009; DRAFT MIPI Alliance Specification for DigRFλSM v4; 2009; pp. 1-192; MIPI Alliance, Inc.
U.S. Appl. No. 12/951,047 Office Action dated Mar. 1, 2013.

\* cited by examiner

*Primary Examiner* — Yemane Mesfin
*Assistant Examiner* — Wanda Z Russell

(57) ABSTRACT

An apparatus includes Radio Frequency (RF) circuitry, multiple message sources and strobe multiplexing logic. The RF circuitry is configured to synchronize communication of RF signals based on reception of strobe messages. The multiple message sources are each configured to generate respective ones of the strobe messages for synchronizing the RF circuitry. The strobe multiplexing logic is configured to multiplex the strobe messages originating from the multiple message sources, and to send the multiplexed strobe messages over a single digital interface to the RF circuitry.

16 Claims, 2 Drawing Sheets

MULTIPLE TIME ACCURATE STROBE (TAS) MESSAGING

CROSS-REFERENCE TO RELATED APPLICATIONS

This application claims the benefit of U.S. Provisional Patent Application 61/263,643, filed Nov. 23, 2009, whose disclosure is incorporated herein by reference in its entirety.

FIELD OF THE DISCLOSURE

The present disclosure relates generally to communication systems, and particularly to processing of timing strobe messages in communication equipment.

BACKGROUND

Some communication systems carry out emit etarucca functions using timing strobe messages. For example, the DigRF specifications developed by the Mobile Industry Processor Interface (MIPI) Alliance define Time Accurate Strobe (TAS) messages for synchronizing Baseband Integrated Circuits (BBICs) and Radio Frequency Integrated Circuits (RFICs) over DigRF interfaces.

DigRF interfaces are specified, for example, in "MIPI Alliance Specification for DigRF v4," draft version 1.00.00, revision 0.03, Dec. 15, 2009, which is incorporated herein by reference in its entirety. Section 6.5.3 of this specification addresses TAS messages. DigRF interfaces are also specified in "MIPI Alliance Specification for Dual Mode 2.5G/3G Baseband/RFIC Interface," draft version 3.09.05, revision 0.02, Dec. 7, 2009, which is incorporated herein by reference in its entirety.

In the context of the present patent application and in the claims, the term "DigRF specification" refers collectively to any and all DigRF specifications and their variants and extensions, unless specifically noted otherwise.

The description above is presented as a general overview of related art in this field and should not be construed as an admission that any of the information it contains constitutes prior art against the present patent application.

SUMMARY

An embodiment that is described herein provides an apparatus including Radio Frequency (RF) circuitry, multiple message sources and strobe multiplexing logic. The RF circuitry is configured to synchronize communication of RF signals based on reception of strobe messages. The multiple message sources are each configured to generate respective ones of the strobe messages for synchronizing the RF circuitry. The strobe multiplexing logic is configured to multiplex the strobe messages originating from the multiple message sources, and to send the multiplexed strobe messages over a single digital interface to the RF circuitry.

In some embodiments, the single digital interface operates in accordance with a DigRF specification, the multiple message sources are configured to generate DigRF Time Accurate Strobe (TAS) messages, and the RF circuitry is configured to synchronize the communication based on the reception of the multiplexed TAS messages. In an embodiment, at least first and second message sources among the multiple message sources are configured to generate the respective strobe messages in accordance with respective different first and second Radio Access Technologies (RATs).

In a disclosed embodiment, a first message source among the multiple message sources is configured to generate the respective strobe messages using hardware, and a second message source among the multiple message sources is configured to generate the respective strobe messages using software. In another embodiment, a first message source among the multiple message sources is configured to generate the respective strobe messages using a first hardware unit, and a second message source among the multiple message sources is configured to generate the respective strobe messages using a second hardware unit that is separate from the first hardware unit.

In some embodiments, the strobe multiplexing logic includes a priority handler, which is configured to multiplex the strobe messages generated by the message sources in accordance with respective priorities that are assigned to the message sources. In an embodiment, the strobe multiplexing logic is configured to multiplex a first strobe message generated according to a first Radio Access Technology (RAT) and a second strobe message generated according to a second RAT that is different from the first RAT. In an embodiment, a mobile communication terminal includes the disclosed apparatus. In another embodiment, a chipset for processing signals in a mobile communication terminal includes the disclosed apparatus.

There is additionally provided, in accordance with an embodiment that is described herein, a method including generating strobe messages using multiple message sources for synchronizing Radio Frequency (RF) circuitry. The strobe messages originating from the multiple message sources are multiplexed, and the multiplexed strobe messages are sent over a single digital interface to the RF circuitry. Communication of RF signals in the RF circuitry is synchronized based on the reception of the multiplexed strobe messages.

The present disclosure will be more fully understood from the following detailed description of the embodiments thereof, taken together with the drawings in which:

DETAILED DESCRIPTION OF EMBODIMENTS

Embodiments that are described herein provide improved methods and systems for processing timing strobe messages in communication equipment. In some embodiments, a mobile communication terminal comprises baseband (BB) circuitry and Radio Frequency (RF) circuitry, which are interconnected by a digital interface such as a DigRF interface. The RF circuitry transmits and/or receives RF signals that are synchronized to a certain air interface. The timing of the air interface is typically governed by the BB circuitry, and the BB circuitry synchronizes the RF circuitry to this timing by sending strobe messages from the BB circuitry to the RF circuitry over the digital interface.

In the embodiments described herein, the BB circuitry comprises multiple messages sources, such as modems of various Radio Access Technologies (RATs). Each message source is configured to generate strobe messages in order to synchronize the RF circuitry to the timing of the respective RAT. The message sources may be implemented in hardware or in software. Hybrid implementations comprising one or more hardware-implemented message sources and one or more software-implemented message sources are also possible. In some embodiments, the BB circuitry comprises strobe multiplexing logic, which multiplexes the strobe messages that originate from the multiple message sources and sends the multiplexed strobe messages over a single digital interface to the RF circuitry.

By using the disclosed techniques, a mobile communication terminal can synchronize with multiple message sources (e.g., multiple RAT modems in a multi-RAT terminal) using only a single digital interface. The disclosed techniques allow each message source (e.g., each RAT) to operate independently, without having to coordinate TAS message generation between message sources. In some embodiments, the BB circuitry comprises a priority handler to resolve collisions between strobe messages originating from different message sources.

Figure 1:
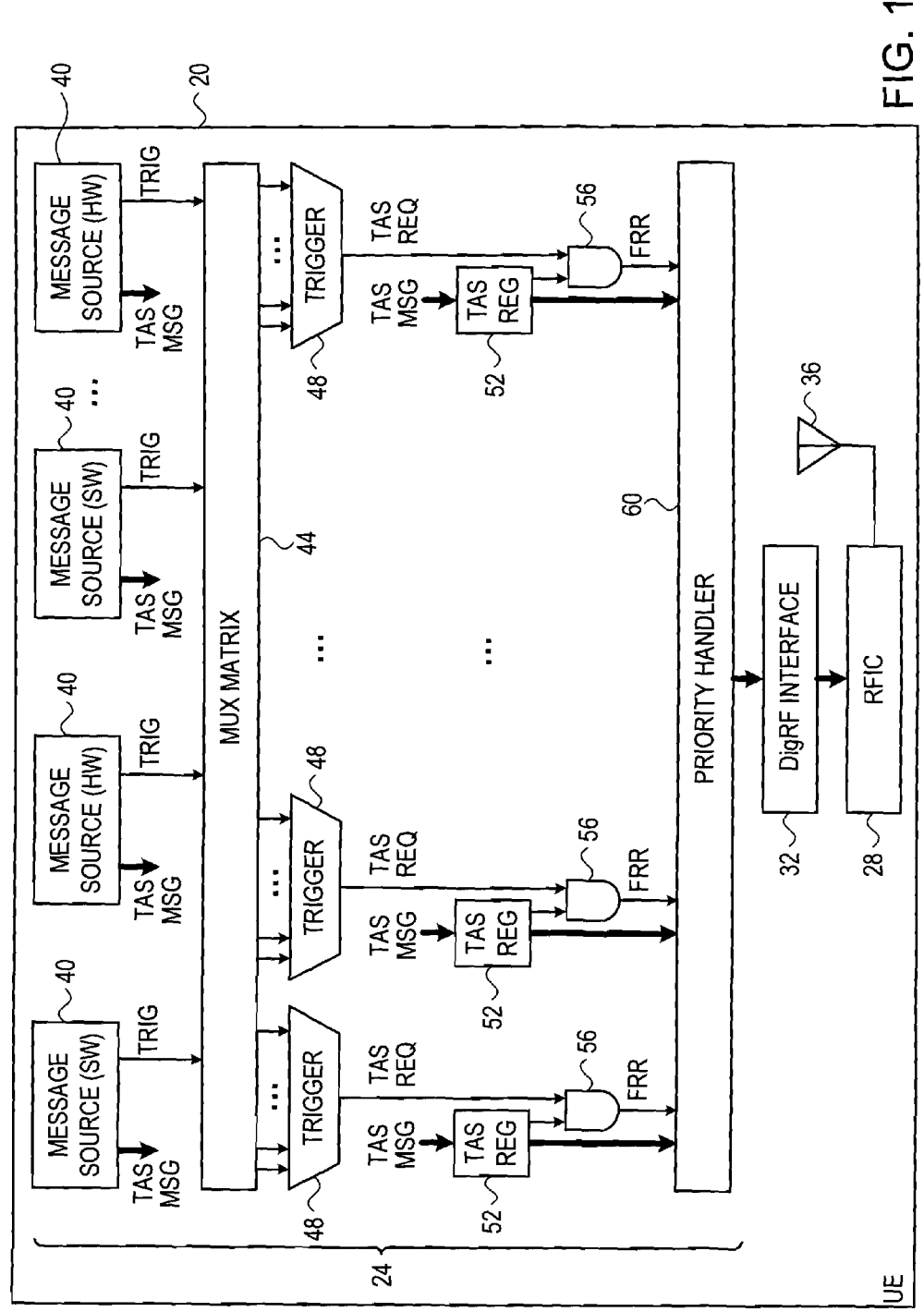
FIG. 1 is a block diagram that schematically illustrates a mobile communication terminal that uses TAS message multiplexing, in accordance with an embodiment that is described herein.

FIG. 1 is a block diagram that schematically illustrates a mobile communication terminal 20 that is configured to use TAS message multiplexing, in accordance with an embodiment that is described herein. In the embodiment seen in FIG. 1, terminal 20 comprises, for example, a mobile phone, a wireless-enabled mobile computing device, or any other suitable type of communication terminal. Terminal 20 is also referred to as User Equipment (UE). Although the embodiments described herein refer mainly to communication terminals, the disclosed techniques can be used for synchronization in other types of communication equipment, such as base stations.

In the present example, UE 20 comprises BB circuitry 24 (e.g., a BB Integrated Circuit—BBIC) that communicates with a Radio Frequency Integrated Circuit (RFIC) 28 via a single DigRF interface 32. Interface 32 is also referred to as a DigRF interface physical layer (PHY), or DigRF interface for brevity. RFIC 28 communicates with a suitable base station (not shown) using RF signals via an antenna 36. Upon transmission, BBIC 24 produces messages for transmission and transfers them over DigRF interface 32 to RFIC 28. On reception, RFIC 28 receives messages and transfers them for decoding to BBIC 24 via DigRF interface 32.

(The arrow directions in FIG. 1 refer to the flow of TAS messages and associated trigger signals. Generally, however, data flow in UE 20 occurs in both directions, i.e., from RFIC 28 via DigRF interface 32 to BB circuitry 24, as well as from BB circuitry 24 via DigRF interface 32 to RFIC 28. Arrows indicating bidirectional data flow are not shown in the figure for the sake of clarity.)

UE 20 operates in accordance with one or more Radio Access Technologies (RATs). In some embodiments, the UE supports a single RAT. In alternative embodiments, the UE supports multiple RATs. In an embodiment, the RATs supported by UE 20 comprise, for example, one or more of Evolved Universal Terrestrial Radio Access (E-UTRA), also referred to as Long-Term Evolution (LTE), LTE-Advanced (LTE-A) or other derivative, development or variant of the LTE or LTE-A specifications, Global System for Mobile communications (GSM), Wideband Code-Division Multiple Access (WCDMA), and/or any other suitable RAT. At a given time, transmission and reception in RFIC 32 are performed in accordance with a certain selected RAT.

The RAT typically specifies a protocol in time and/or frequency that governs the transmission and reception of messages by RFIC 28. For example, the RAT may define a system clock, and timing accuracy requirements with respect to the system clock that should be met by RFIC 28. In some embodiments, the RAT timing is governed by BBIC 24, and the BBIC synchronizes RFIC 28 to this timing by sending Time Accurate Strobe (TAS) messages to RFIC 28 over DigRF interface 32.

In an embodiment, TAS messages are short messages that are specified to have an accurate transmission time that is indicative of the RAT timing (e.g., of the system clock). RFIC 28 synchronizes to the RAT timing by synchronizing to the arrival of TAS messages from BBIC 24. (Although the embodiments described herein refer mainly to DigRF interfaces and TAS messages, the disclosed techniques can be used for synchronization over any other suitable digital interface, and any other suitable type of strobe messages. The disclosed techniques are applicable to any suitable control interface having accurate timing requirements.)

In the example of FIG. 1, BB circuitry 24 comprises multiple message sources 40. The term "message source" refers to any hardware and/or software element in UE 20 that generates messages. Typically, each message source comprises a transmit and/or receive modem of a certain RAT that is supported by UE 20. In some embodiments, both transmit and receive functions of a given RAT are implemented by a single message source. In alternative embodiments, the transmit and receive functions of a given RAT are performed by separate message sources.

Any message source 40 may be implemented in hardware, in software, or using a combination of hardware and software elements. In some embodiments, one or more of message sources 40 in UE 20 are implemented in hardware, and one or more other message sources 40 are implemented in software. In some embodiments, at least two hardware-implemented message sources are implemented in separate hardware units, e.g., in separate circuits that are disposed, for example, on separate semiconductor dies or in separate packaged devices. In an embodiment, the transmit functions of a given RAT are carried out by a hardware-based message source and the receive functions of the same RAT are carried out by a software-based message source, or vice versa. In an alternative embodiment, both transmission and reception of a given RAT are performed using hardware. In another embodiment, both transmission and reception of a given RAT are performed using software. UE 20 may comprise any suitable number of message sources 40.

Each message source 40 in UE 20 generates TAS messages in order to synchronize RFIC 28 to the timing of its respective RAT. (As noted above, each message source 40 complies with a certain RAT, but in some embodiments a given RAT is handled by more than a single message source.) Typically, a given message source generates a TAS message by producing the actual message (marked "TAS MSG" in the figure) and a trigger (marked "TRIG" in the figure) that indicates the time at which the TAS message is to be transferred to RFIC 28. The TAS messages produced by message sources 40 are multiplexed and sent to RFIC 28 via the single DigRF interface 32, as will be shown below. In FIG. 1, message paths are marked with bold arrows, and trigger paths are marked with fine arrows.

In an embodiment, BBIC 24 comprises one or more TAS message registers 52. Any suitable number of TAS message registers may be used. The number of TAS message registers 52 may be smaller than, larger than or equal to the number of message sources 40. When a certain message source 40 generates a TAS message, the message is loaded to one of registers 52. Once loaded, the TAS message waits for the respective trigger to be issued by the message source before it is transmitted to RFIC 28.

In an embodiment, BBIC 24 comprises a multiplexing matrix 44 and multiple trigger multiplexers 48. Each trigger multiplexer 48 corresponds to a respective TAS message register 52. In other words, each trigger multiplexer 48 processes the triggers that correspond to the TAS messages stored in the respective TAS message register 52. Multiplexing matrix 44 maps message sources 40 to trigger multiplexers 48 in accordance with a certain multiplexing scheme. In some embodiments, the multiplexing scheme is fixed. In alternative embodiments, the multiplexing scheme of matrix 44 is configurable, e.g., by a controller (not shown in the figure), and can be modified at any suitable time.

Consider a given TAS message register 52 and the associated trigger multiplexer 48 in FIG. 1. When trigger multiplexer 48 receives a trigger for a TAS message that has been loaded into register 52, the trigger multiplexer outputs a TAS REQUEST signal. A respective AND gate 56 outputs a FRAME REQUEST READY (FRR) signal when the TAS REQUEST is produced, assuming the TAS message register is already loaded with the TAS message. The TAS messages (i.e., the contents of registers 52) and the corresponding triggers are multiplexed and sent to DigRF interface 32. Typically, any TAS message that is ready for transmission is sent to DigRF interface 32 at the time defined by the respective FRR signal.

In some embodiments, BBIC 24 comprises a priority handler 60, which mitigates collisions between TAS messages from different message sources that overlap in time. In an example embodiment, priority handler 60 holds a predefined set of priorities among message sources 40. When two or more TAS messages from different message sources overlap, i.e., arrive in priority handler 60 approximately at the same time, the priority handler transfers the TAS message having the highest priority, and discards the other message or messages. In some embodiments, collisions between TAS messages should not occur when UE 20 functions properly, since the UE typically coordinates the operation of the various message sources. Nevertheless, priority handler 60 is useful in such embodiments as a protection mechanism.

Typically, at any given time UE 20 operates in accordance with a certain selected RAT. Therefore, the TAS messages generated at any given time will usually originate from the message source or sources that correspond to the currently-used RAT. Nevertheless, in some embodiments message sources 40 may generate TAS messages pertaining to different RATs in close proximity to one another. Scenarios of this sort may occur, for example, when the UE is in the process of switching from one RAT to another. As another example, the UE may communicate using one RAT, and at the same time conduct channel measurements using another RAT. In these embodiments, matrix 44, multiplexers 48, registers 52 and AND gates 56 typically multiplex the TAS messages of the different RATs during the time interval in question.

The configuration of UE 20 in FIG. 1 is an example configuration, which is chosen solely for the sake of clarity. In alternative embodiments, any other suitable UE configuration can also be used. Some UE elements that are not mandatory for understanding of the disclosed techniques have been omitted from the figure for the sake of clarity. In the present context, multiplexing matrix 44, trigger multiplexers 48, TAS message registers 52, AND gates 56 and priority handler are referred to collectively as strobe multiplexing logic, which multiplexes the TAS messages generated by message sources 40 and sends the multiplexed messages over the single DigRF interface.

The different elements of UE 20, including message sources 40, matrix 44, multiplexers 48, registers 52, AND gates 56, priority handler 60, interface 32 and RFIC 28 may be implemented using dedicated hardware, such as using one or more Application-Specific Integrated Circuits (ASICs) and/or Field-Programmable Gate Arrays (FPGAs) and/or other suitable hardware devices. Alternatively, some UE elements may be implemented using software running on programmable hardware, or using a combination of hardware and software elements. In some embodiments, some or all of the elements of UE 20 are fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory. The functions of RFIC 32 can be implemented using any suitable type of RF circuitry.

Figure 2:
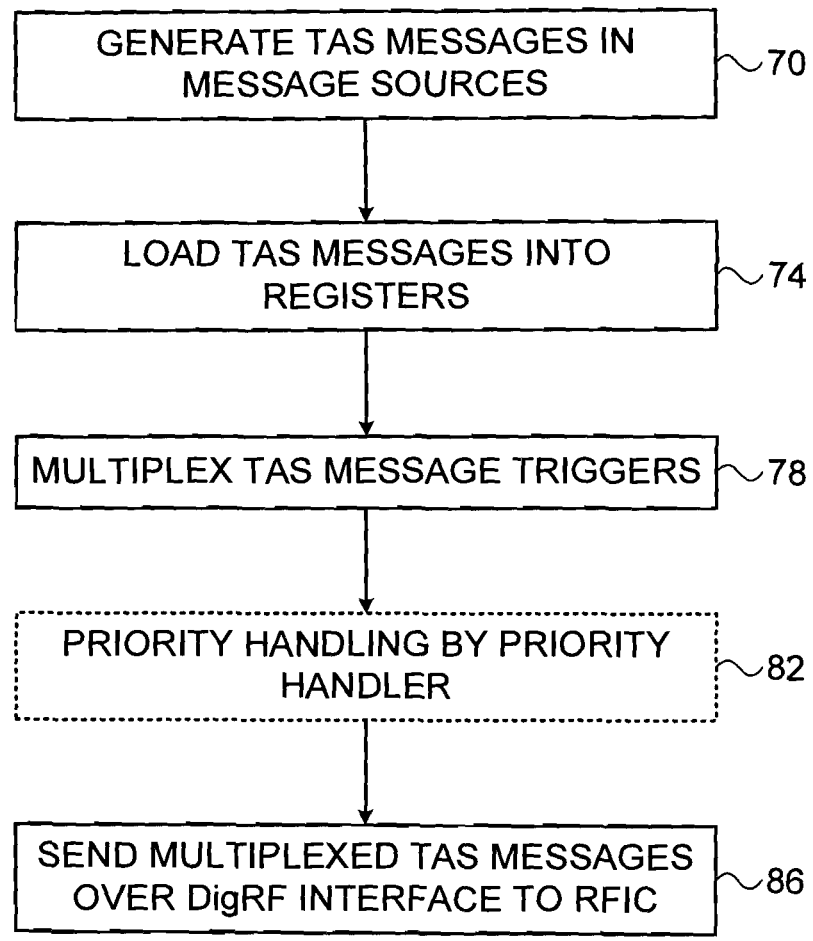
FIG. 2 is a flow chart that schematically illustrates a method for TAS message multiplexing, in accordance with an embodiment that is described herein.

FIG. 2 is a flow chart that schematically illustrates a method for TAS message multiplexing, in accordance with an embodiment that is described herein. The method begins with message sources 40 generating TAS messages, at a message generation operation 70. The messages are loaded into TAS message registers 52, at a register loading operation 74. The multiplexing logic in UE 20 multiplexes the TAS messages and message triggers, at a trigger multiplexing operation 78. Optionally, priority handler 60 filters or otherwise processes the multiplexed triggers, at an optional priority handling operation 82. The multiplexed TAS messages are sent over the single DigRF interface to RFIC 28, at a transmission operation 86. The RFIC synchronizes to the applicable air interface using the received TAS messages.

Although the embodiments described herein mainly address TAS message transfer over DigRF interfaces, the methods and systems described herein can also be used in any other application having multiple message sources and a control interface having accurate timing functionality.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. Apparatus, comprising:
   Radio Frequency (RF) circuitry, which is configured to synchronize communication of RF signals based on reception of strobe messages;
   multiple message sources, each configured to generate respective ones of the strobe messages for synchronizing the RF circuitry, and corresponding trigger signals that define timing of transferring the strobe messages to the RF circuitry; and
   strobe multiplexing logic, comprising:
     one or more trigger multiplexers, which are configured to multiplex the trigger signals generated by the multiple message sources; and
     a priority handler, which is configured to multiplex the strobe messages originating from the multiple message sources in accordance with the timing defined by the multiplexed trigger signals, and to send the multiplexed strobe messages over a single digital interface to the RF circuitry.

2. The apparatus according to claim 1, wherein the single digital interface operates in accordance with a DigRF specification, wherein the multiple message sources are configured to generate DigRF Time Accurate Strobe (TAS) messages, and wherein the RF circuitry is configured to synchronize the communication based on the reception of the multiplexed TAS messages.

3. The apparatus according to claim 1, wherein at least first and second message sources among the multiple message sources are configured to generate the respective strobe messages in accordance with respective different first and second Radio Access Technologies (RATs).

4. The apparatus according to claim 1, wherein a first message source among the multiple message sources is configured to generate the respective strobe messages using hardware, and wherein a second message source among the multiple message sources is configured to generate the respective strobe messages using software.

5. The apparatus according to claim 1, wherein a first message source among the multiple message sources is configured to generate the respective strobe messages using a first hardware unit, and wherein a second message source among the multiple message sources is configured to generate the respective strobe messages using a second hardware unit that is separate from the first hardware unit.

6. The apparatus according to claim 1, wherein the priority handler is configured to multiplex the strobe messages generated by the message sources in accordance with respective priorities that are assigned to the message sources.

7. The apparatus according to claim 1, wherein the strobe multiplexing logic is configured to multiplex a first strobe message generated according to a first Radio Access Technology (RAT) and a second strobe message generated according to a second RAT that is different from the first RAT.

8. A mobile communication terminal comprising the apparatus of claim 1.

9. A chipset for processing signals in a mobile communication terminal, comprising the apparatus of claim 1.

10. A method, comprising:
using multiple message sources, generating strobe messages for synchronizing Radio Frequency (RF) circuitry, and generating trigger signals that define timing of transferring the respective strobe messages to the RF circuitry;
multiplexing the trigger signals generated by the multiple message sources;
multiplexing the strobe messages originating from the multiple message sources in accordance with the timing defined by the multiplexed trigger signals, and sending the multiplexed strobe messages over a single digital interface to the RF circuitry; and
synchronizing communication of RF signals in the RF circuitry based on the reception of the multiplexed strobe messages.

11. The method according to claim 10, wherein the single digital interface operates in accordance with a DigRF specification, and wherein generating the strobe messages comprises generating DigRF Time Accurate Strobe (TAS) messages.

12. The method according to claim 10, wherein generating the strobe messages comprises generating the strobe messages from at least first and second message sources among the multiple message sources in accordance with respective different first and second Radio Access Technologies (RATs).

13. The method according to claim 10, wherein generating the strobe messages comprises generating the strobe messages from a first message source among the multiple message sources using hardware, and from a second message source among the multiple message sources using software.

14. The method according to claim 10, wherein generating the strobe messages comprises generating the strobe messages from a first message source among the multiple message sources using a first hardware unit, and from a second message source among the multiple message sources using a second hardware unit that is separate from the first hardware unit.

15. The method according to claim 10, wherein multiplexing the strobe messages comprises multiplexing the strobe messages generated by the message sources in accordance with respective priorities that are assigned to the message sources.

16. The method according to claim 10, wherein multiplexing the strobe messages comprises multiplexing a first strobe message generated according to a first Radio Access Technology (RAT) and a second strobe message generated according to a second RAT that is different from the first RAT.

* * * * *